US010446878B2

(12) United States Patent
Choi et al.

(10) Patent No.: US 10,446,878 B2
(45) Date of Patent: Oct. 15, 2019

(54) BUS BAR STRUCTURE WITH FUSE CASE BETWEEN BUS BARS

(71) Applicant: LG CHEM, LTD., Seoul (KR)

(72) Inventors: Yang-Kyu Choi, Daejeon (KR);
Bo-Sung Kim, Daejeon (KR);
Sang-Yoon Jeong, Daejeon (KR);
Seong-Tae Kim, Daejeon (KR);
Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/575,465

(22) PCT Filed: Jul. 11, 2016

(86) PCT No.: PCT/KR2016/007521
§ 371 (c)(1),
(2) Date: Nov. 20, 2017

(87) PCT Pub. No.: WO2017/010776
PCT Pub. Date: Jan. 19, 2017

(65) Prior Publication Data
US 2018/0198172 A1 Jul. 12, 2018

(30) Foreign Application Priority Data

Jul. 13, 2015 (KR) .......................... 10-2015-0099162

(51) Int. Cl.
*H01M 10/42* (2006.01)
*H01H 85/041* (2006.01)
(Continued)

(52) U.S. Cl.
CPC ........ *H01M 10/425* (2013.01); *H01H 85/041* (2013.01); *H01M 2/206* (2013.01);
(Continued)

(58) Field of Classification Search
CPC ...... H01M 2/1077; H01M 2/26; H01M 2/206; H01M 2/348; H01M 10/425;
(Continued)

(56) References Cited

U.S. PATENT DOCUMENTS 4,224,592 A * 9/1980 Urani .................. H01H 69/02
337/198
6,007,350 A * 12/1999 Isshiki ............... H01H 85/0417
439/76.2
(Continued)

FOREIGN PATENT DOCUMENTS

EP 1 075 012 A2 2/2001
EP 2 538 469 A2 12/2012
(Continued)

OTHER PUBLICATIONS

International Search Report (PCT/ISA/210) issued in PCT/KR2016/007521, dated Oct. 21, 2016.

*Primary Examiner* — Edu E. Enin-Okut
(74) *Attorney, Agent, or Firm* — Birch, Stewart, Kolasch & Birch, LLP

(57) ABSTRACT

Provided is a bus bar structure which may be suitable for reducing an occupied area of a printed circuit board (PCB) by removing a fuse from the PCB in an interconnect board (ICB) assembly of a battery pack. According to the present disclosure, the bus bar structure may include: bus bars which face each other and are arranged below the PCB in the ICB assembly of the battery pack; and a fuse case between the bus bars, wherein the fuse case includes a fuse wire therein and is configured to bring the fuse wire into contact with the bus bars via at least one end thereof.

7 Claims, 9 Drawing Sheets

(51) Int. Cl.
*H01M 2/20* (2006.01)
*H01M 2/34* (2006.01)
*H01M 2/26* (2006.01)
*H01M 2/10* (2006.01)
*H01H 85/044* (2006.01)

(52) U.S. Cl.
CPC .......... *H01M 2/26* (2013.01); *H01M 2/348* (2013.01); *H01H 85/044* (2013.01); *H01M 2/1077* (2013.01); *H01M 2010/4271* (2013.01); *H01M 2200/103* (2013.01); *H01M 2220/20* (2013.01)

(58) Field of Classification Search
CPC ..... H01M 2010/4271; H01M 2220/20; H01M 2220/103; H01H 85/041; H01H 85/0411
See application file for complete search history.

(56) References Cited

U.S. PATENT DOCUMENTS

| | | |
|---|---|---|
| 8,790,803 B2 | 7/2014 | Byun et al. |
| 8,808,031 B2 | 8/2014 | Zhao |
| 2012/0126929 A1 | 5/2012 | Tong et al. |
| 2014/0315051 A1 | 10/2014 | Han et al. |

FOREIGN PATENT DOCUMENTS

| | | | |
|---|---|---|---|
| EP | 2 698 847 A1 | 2/2014 | |
| EP | 2698847 A1 * | 2/2014 | ............. H01M 2/30 |
| JP | 62-142144 U | 9/1987 | |
| JP | 2001-054223 A | 2/2001 | |
| JP | 2001-338633 A | 12/2001 | |
| KR | 10-1198620 B1 | 11/2012 | |
| KR | 10-2013-0008223 A | 1/2013 | |
| KR | 10-2014-0095660 A | 8/2014 | |
| KR | 10-2014-0125194 A | 10/2014 | |
| KR | 10-1528003 B1 | 6/2015 | |
| WO | WO 2013/090649 A1 | 6/2013 | |
| WO | WO-2013090649 A1 * | 6/2013 | ........... H01M 2/206 |

* cited by examiner

BUS BAR STRUCTURE WITH FUSE CASE BETWEEN BUS BARS

TECHNICAL FIELD

The present disclosure relates to a bus bar structure suitable for preventing an overcurrent flow in an electrical path between components.

The present application claims priority to Korean Patent Application No. 10-2015-0099162 filed on Jul. 13, 2015 in the Republic of Korea, the disclosure of which is incorporated herein by reference.

BACKGROUND ART

Recently, in order to reduce air pollution caused by exhaust gas of a vehicle, the vehicle is manufactured on a basis of research on securing a driving force by using an internal combustion engine and/or an electric motor. Accordingly, the vehicle has evolved in an order of a hybrid car, a plug-in hybrid car, and an electric car. In this case, the hybrid vehicle and the plug-in hybrid vehicle include the internal combustion engine, the electric motor and a battery pack, while the electric vehicle includes the electric motor and the battery pack, without the internal combustion engine.

The battery pack has evolved along with the hybrid car, the plug-in hybrid car, and the electric vehicle. The battery pack is configured to be chargeable outside the electric vehicle. The battery pack includes battery cells, an interconnect board (ICB) assembly, and a battery management system (BMS). The battery cells are connected in series or in parallel in the battery pack. The ICB assembly is arranged around the battery cells and transfers to the BMS an electrical signal corresponding to temperature of the battery cell and an electrical signal corresponding to current or voltage of the battery cell during repeated charging and discharging of the battery cells.

The BMS receives electrical signals related to the battery cells from the ICB assembly and controls charging and discharging of the battery cells based on the electrical signals. In this case, the ICB assembly includes bus bars and a printed circuit board (PCB). The PCB contacts the bus bars and the bus bars respectively contact the battery cells. In addition, the bus bars are electrically connected to fuses on the PCB in a one-to-one correspondence. The fuse cuts off overcurrent which sequentially passes through the battery cell and the bus bar, and flows into the PCB.

However, since the fuses are arranged on the PCB by the number of the bus bars, the fuses limit pitches of components on the PCB. Accordingly, a length of an electrical path between the bus bar and the fuse may not reduce a size of the PCB. A lot of research has been conducted on the length of the electrical path between the bus bar and the fuse. One example of the researches was disclosed in 'a battery cell case and a battery pack including the same', Korean Patent Application Publication No. 10-2014-0095660 (published on Aug. 4, 2014).

The battery cell case includes a support unit and a PCB. The support unit includes connection bus bars wrapping one side of the battery cell and respectively connected to the battery cells. The PCB, which is arranged on a side surface of the support unit and connected to the connection bus bars, transfers information about temperature and voltage of the battery cells to a battery control unit. In this case, the PCB includes fuses which are arranged on side surfaces of the bus bars in a one-to-one correspondence and directly contact the bus bars.

However, since the fuse is arranged on the PCB, the fuse limits an area occupied by the PCB in the battery cell case. Therefore, a conventional art may not contribute to reducing the area occupied by the PCB and thereby, reducing a volume of the battery pack.

DISCLOSURE

Technical Problem

The present disclosure is designed to solve the problems of the related art, and therefore the present disclosure is directed to provide a bus bar structure suitable for reducing an area occupied by a printed circuit board (PCB) in an interconnect board (ICB) assembly and thus, reducing a volume of a battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a bus bar structure including: bus bars which face each other and are arranged below the PCB in the ICB assembly of the battery pack; and a fuse case between the bus bars, wherein the fuse case includes a fuse wire therein and is configured to bring the fuse wire into contact with the bus bars via at least one end thereof.

According to the present disclosure, one of the bus bars may be configured to contact the PCB and the other bus bar may contact an electrode lead of a battery cell.

Preferably, the bus bars may be arranged flat on a same level around opposite ends thereof facing each other, and the fuse case may include the fuse wire between grooves which are respectively arranged at both ends thereof and extend inwardly from both the ends thereof and may be configured to expose the fuse wire to the grooves and to bring the bus bars into contact with the fuse wire by receiving the bus bars via the grooves.

In another aspect of the present disclosure, the bus bars may be arranged flat on a same level around opposite ends thereof facing each other, and the fuse case having a 'U' shaped cross-section may include the fuse wire exposed on an inner circumferential surface thereof and may be configured to bring the bus bars into contact with the fuse wire by receiving the bus bars via a bent portion defined by the inner circumferential surface thereof.

In another aspect of the present disclosure, the bus bars may be arranged flat on a same level around opposite ends facing each other, and the fuse case having a 'hollow rectangular' shaped cross-section may include the fuse wire exposed on an inner circumferential surface thereof and may be configured to bring the bus bars into contact with the fuse wire by receiving the bus bars via a through-hole defined by the inner circumferential surface thereof.

In another aspect of the present disclosure, the bus bars may respectively include grooves extending inwardly from ends thereof at opposite ends thereof on a same level and facing each other, and the fuse case having a rectangular pillar shape may include the fuse wire exposed to an outer circumferential surface thereof and may be configured to bring the fuse wires into contact with the bus bars by being received by the grooves of the bus bars.

In another aspect of the present disclosure, the bus bars may respectively include bent ends extending toward and face each other at opposite ends thereof on a same level, and the fuse case may include a fuse wire exposed to a groove at one end and may be configured to bring the bent ends into contact with the fuse wire by receiving the bent ends via the groove.

According to the present disclosure, the bus bars and the fuse wire may include metals and the fuse case may include a transparent insulating material which projects the fuse wire from the inside of the fuse case to the outside thereof.

Advantageous Effects

A bus bar structure according to the present disclosure may include a fuse case between bus bars in an interconnect board (ICB) assembly and thus, reduce a size of a printed circuit board (PCB).

The bus bar structure according to the present disclosure may reduce an area occupied by the PCB by removing a fuse from the PCB in the ICB assembly and thus, reduce a volume of a battery pack by reducing sizes of the ICB assembly and the PCB.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the embodiments described below, a battery cell may be referred to as a lithium secondary battery. In this case, the lithium secondary battery may be collectively referred to as a secondary battery in which lithium ions act as working ions during charging and discharging to produce an electrochemical reaction between a positive electrode and a negative electrode. However, it is apparent that the present disclosure may not be limited to the type of a battery.

Figure 1:
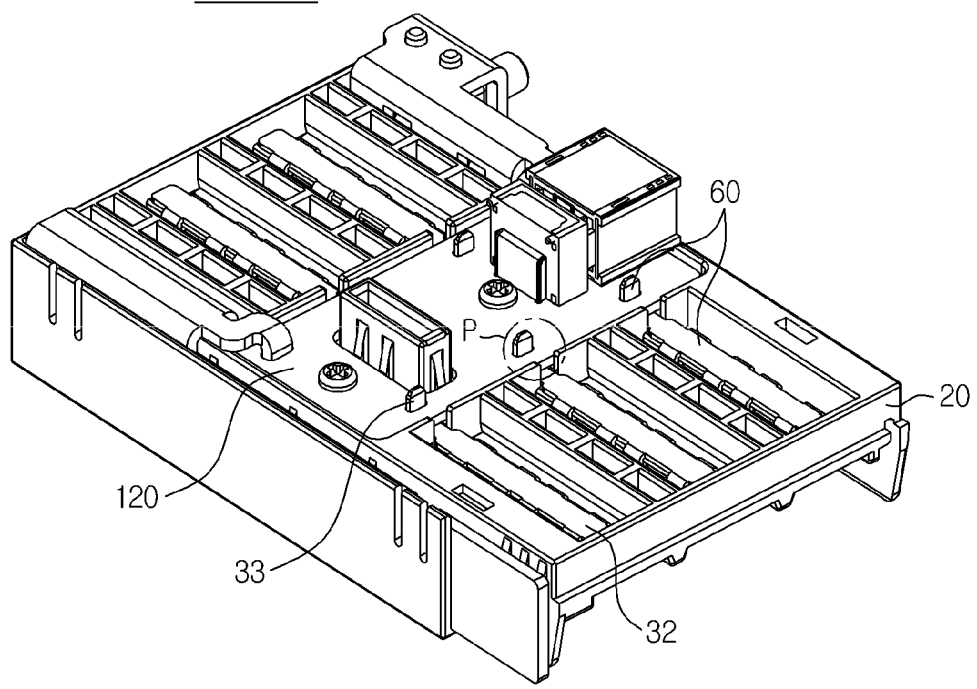
FIG. 1 is a perspective view of an interconnect board (ICB) assembly in a battery pack according to the present disclosure.

FIG. 1 is a perspective view of an interconnect board (ICB) assembly 130 in a battery pack 140 according to the present disclosure.

Referring to FIG. 1, in the battery pack 140, the ICB assembly 130 may include a base structure 20, bus bar structures 60, and a printed circuit board (PCB) 120. The base structure 20 may receive electrode leads 6 of the battery cells 9 in FIG. 9 and guide them to side surfaces of the bus bar structures 60. The bus bar structures 60 may be below the PCB 120.

The bus bar structures 60 may preferably extend from a peripheral region toward a central region of the base structure 20, be in parallel to each other in the base structure 20, and be in a zigzag form. In one aspect of the present disclosure, the bus bars 60 may contact the electrode leads 6 of the battery cells 9 via the base structure 20. The PCB 120 may be above the bus bar structures 60 in the central region of the base structure 20.

The PCB 120 may preferably partially receive the bus bar structures 60 in the central region of the base structure 20 and contact the bus bar structures 60 via circuit patterns (not illustrated). More preferably, each of the bus bar structures 60 may be bent in the central region of the base structure 20 and inserted into the PCB 120 via an end thereof.

Figure 2:
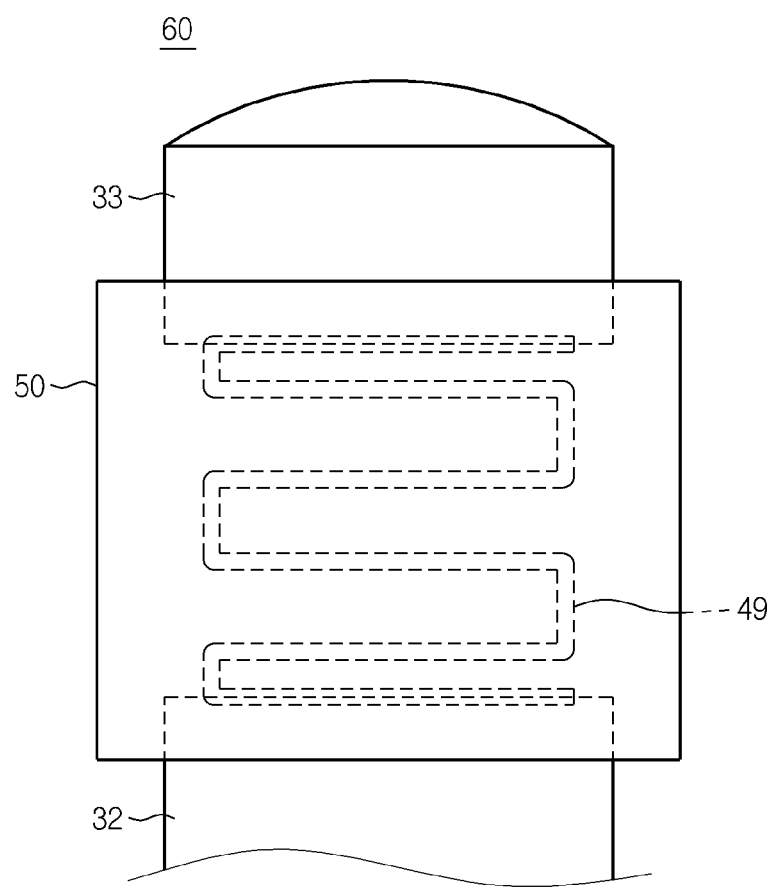
FIG. 2 is a plan view of a bus bar structure in a 'P' region below a printed circuit board (PCB) in FIG. 1, according to an embodiment of the present disclosure.

FIG. 2 is a plan view of the bus bar structure 60 in a 'P' region below the PCB 120 in FIG. 1, according to an embodiment of the present disclosure.

Referring to FIG. 2, the bus bar structure 60 may include a bus bar 32 and a bus bar 33, and a fuse case 50. The bus bars 32 and 33 may be sequentially arranged in one direction below the PCB (120 in FIG. 1) and face each other. The bus bar 32 may preferably extend from the peripheral region to the central region of the base structure 20 of FIG. 1 below the PCB 120 and be bent toward the PCB 120 in the central region of the base structure 20.

In one aspect of the present disclosure, the bus bar 33 may be arranged on a same level as the bus bar 32 and spaced apart from the bus bar 32, and partially inserted into the PCB 120. In other words, the bus bars 32 and 33 may be spaced apart from each other directly under the PCB 120 and arranged on the same level around the opposite ends thereof, and have a flat shape as shown in FIG. 2. The fuse case 50 may be between the bus bars 32 and 33.

The fuse case 50 may preferably include a fuse wire 49 via an injection molding. The fuse wire 49 may be inside the fuse case 50. The fuse wire 49 may preferably have a zigzag shape inside the fuse case 50. In this case, the bus bars 32 and 33 may contact the fuse wire 49 via both ends of the fuse case 50.

The bus bars 32 and 33 and the fuse wire 49 may include metals, and the fuse case 50 may include a transparent insulating material for projecting the fuse wire 49 from the inside of the fuse case to the outside thereof.

Figure 3:
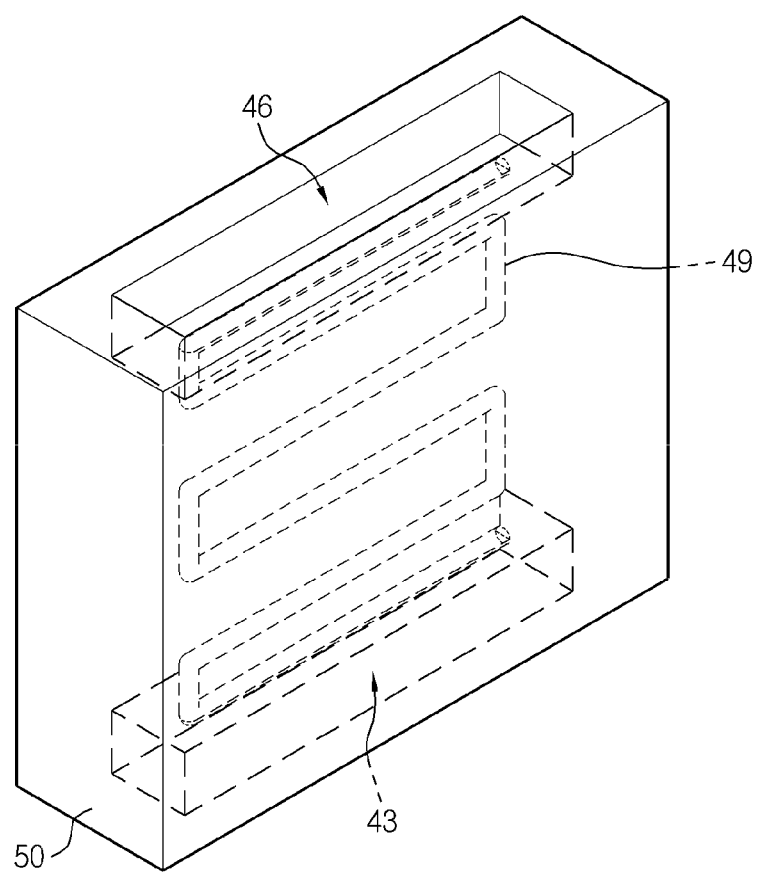
FIG. 3 is a detailed perspective view of a fuse case in FIG. 2.

FIG. 3 is a detailed perspective view of the fuse case 50 in FIG. 2.

Referring to FIG. 3, the fuse case 50 may include a groove 43 and a groove 46 respectively arranged at both ends thereof and extending inwardly from the both ends thereof, and include the fuse wire 49 between the grooves 43 and 46. The fuse wire 49 may be exposed to the grooves 43 and 46, and preferably partially protrude toward the inside of the grooves 43 and 46. In this case, considering FIG. 2, the fuse case 50 may be configured to receive the bus bars 32 and 33 via the grooves 43 and 46, and to bring the bus bars 32 and 33 into contact with the fuse wire 49.

Figure 4:
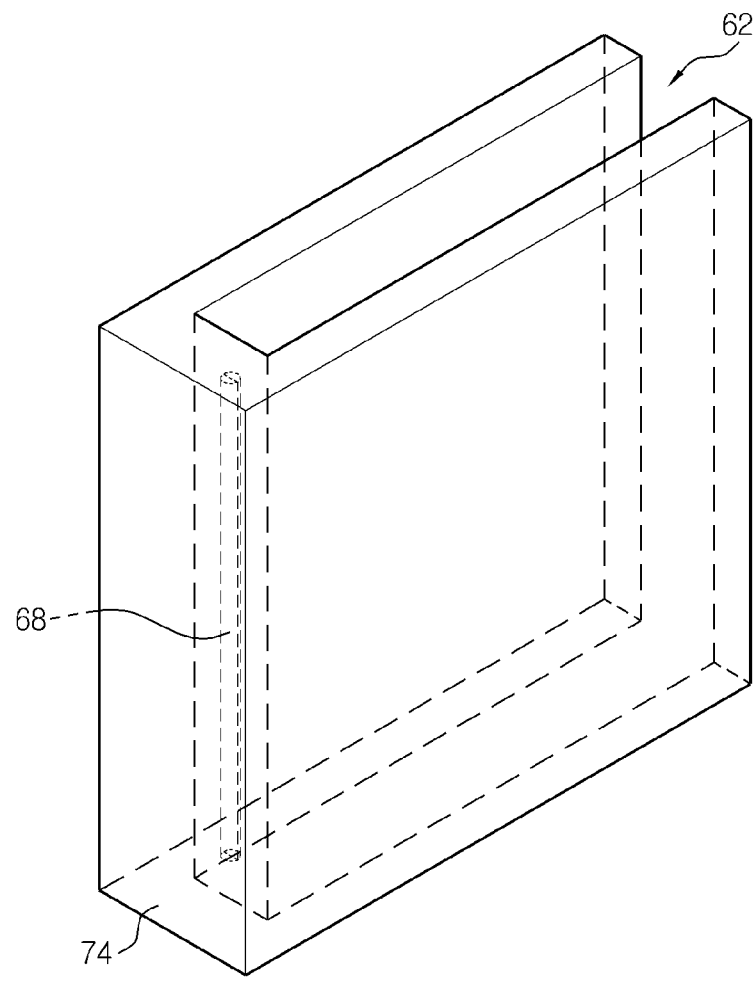
FIG. 4 is a perspective view of a modified example of the fuse case of FIG. 3.

FIG. 4 is a perspective view of a modified example of the fuse case 50 of FIG. 3.

Referring to FIG. 4, the fuse case 74 formed to have a 'U' shaped cross-section may include a bent portion 62 defined by an inner circumferential surface thereof. The fuse case 74 may include a fuse wire 68 via an injection molding. The fuse case 74 may include the fuse wire 68 on the inner circumferential surface thereof so that the fuse wire 68 partially protrudes from the inner circumferential surface thereof by being exposed to the bent portion 62. In this case, considering FIG. 2, the fuse case 74 may be configured to receive the bus bars 32 and 33 via the curved portion 62 and to bring the bus bars 32 and 33 into contact with the fuse wire 68.

The fuse case 74 and the fuse wire 68 may respectively include the same materials as the fuse case 50 and the fuse wire 49 of FIG. 2.

Figure 5:
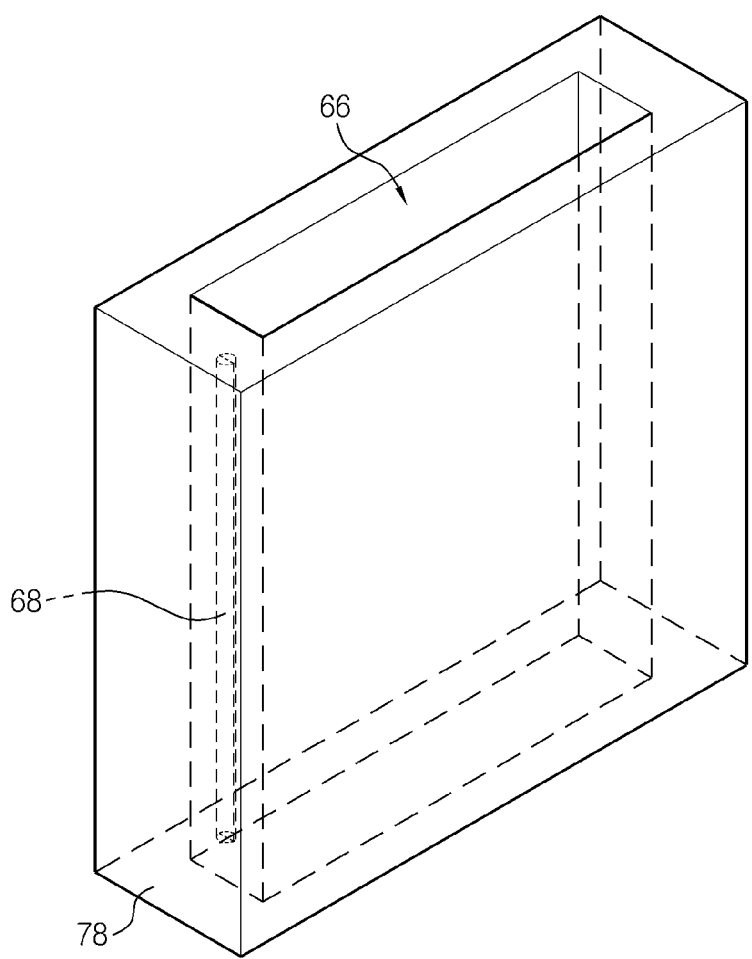
FIG. 5 is a perspective view of another modified example of the fuse case of FIG. 3.

FIG. 5 is a perspective view of another modified example of the fuse case 50 of FIG. 3.

Referring to FIG. 5, the fuse case 78 formed to have a 'hollow rectangular' cross-section may include a through-hole 66 defined by an inner peripheral surface thereof. The fuse case 78 may include a fuse wire 68 via an injection molding. The fuse case 78 may preferably include the fuse wire 68 on the inner circumferential surface thereof so that the fuse wire 68 partially protrudes from the inner circumferential surface of the fuse case 78 by being exposed to the through-hole 66. In this case, considering FIG. 2, the fuse case 78 may be configured to receive the bus bars 32 and 33 via the through-hole 66 and to bring the bus bars 32 and 33 into contact with the fuse wire 68.

The fuse case 78 and the fuse wire 68 may respectively include the same materials as the fuse case 50 and the fuse wire 49 of FIG. 2.

Figure 6:
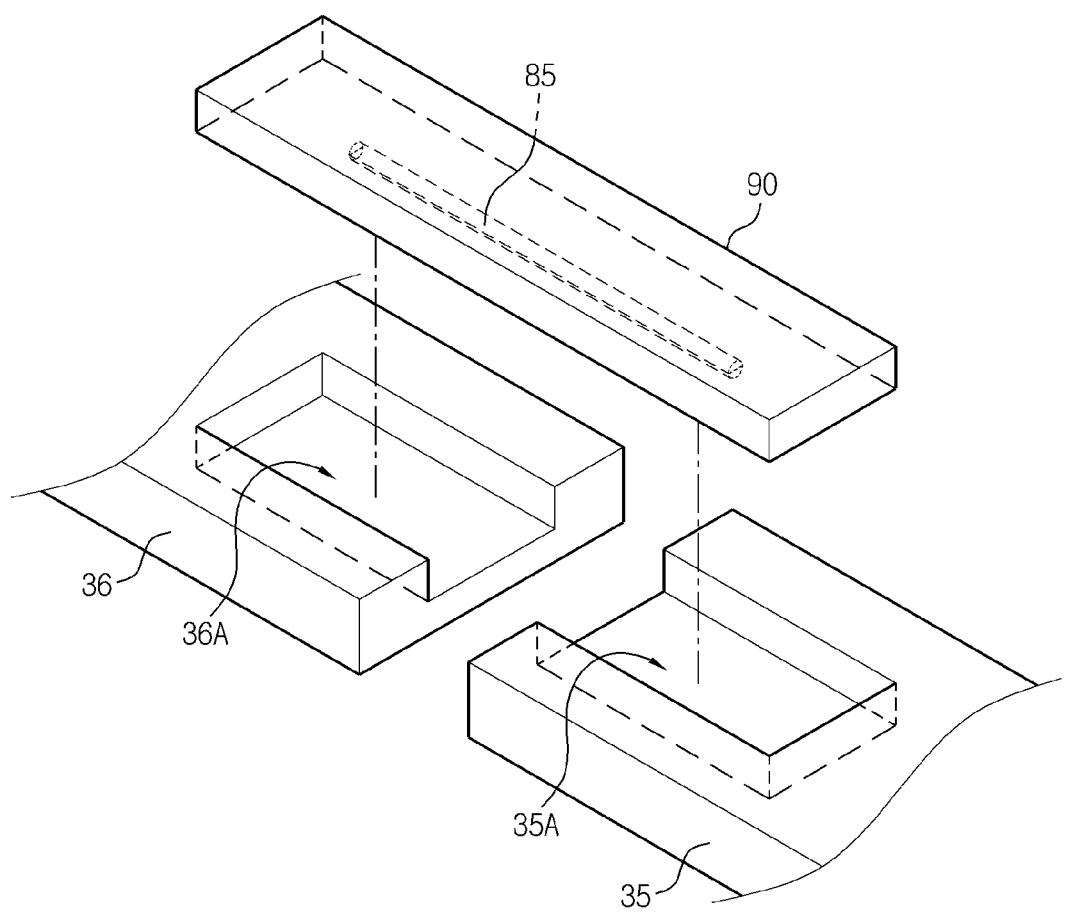
FIG. 6 is an exploded perspective view of a bus bar structure in the 'P' region under the PCB in FIG. 1, according to another embodiment of the present disclosure.

FIG. 6 is an exploded perspective view of a bus bar structure 100 in the 'P' region under the PCB in FIG. 1, according to another embodiment of the present disclosure.

Referring to FIG. 6, the bus bar structure 100 may include bus bars 35 and 36, and a fuse case 90. The bus bars 35 and 36 and the fuse case 90 may have different shapes from the bus bars 32 and 33, and the fuse case 50 of FIG. 1. In other words, the bus bars 35 and 36 may be directly under the PCB (120 in FIG. 1) and include grooves 35A and 35B extending inwardly from ends thereof at opposite ends thereof on a same level and facing each other.

The fuse case 90 may include a fuse wire 85 via an injection molding. The fuse case 90 may have a rectangular pillar shape and include the fuse wire 85 exposed to an outer circumferential surface thereof and partially protruding from the outer circumferential surface thereof. In this case, the fuse case 90 may be configured to be received by the grooves 35A and 35B of the bus bars 35 and 36, and to bring the fuse wire 85 into contact with the bus bars 35 and 36. The bus bars 35 and 36, the fuse wire 85, and the fuse case 90 may respectively include the same materials as the bus bars 32 and 33, the fuse wire 49, and the fuse case 50 in FIG. 2.

Figure 7:
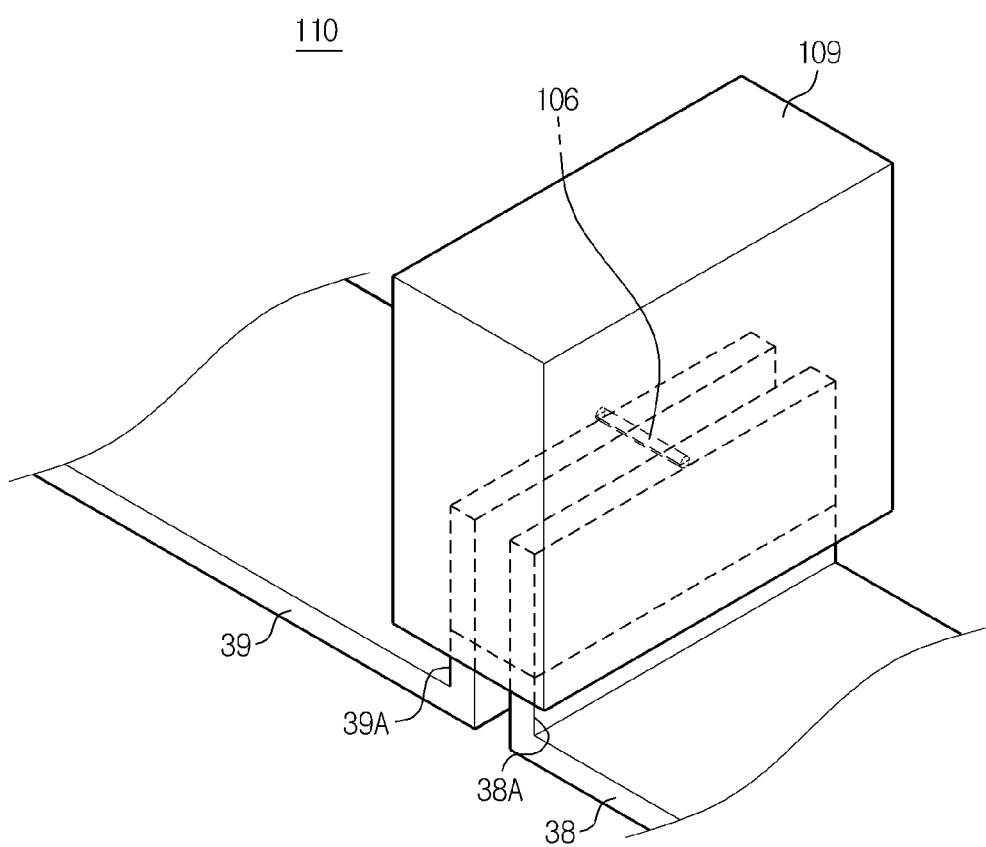
FIG. 7 is a perspective view of a bus bar structure in the 'P' region under the PCB in FIG. 1, according to another embodiment of the present disclosure.

FIG. 7 is a perspective view of a bus bar structure 110 in the 'P' region under the PCB in FIG. 1, according to another embodiment of the present disclosure.

Referring to FIG. 7, the bus bar structure 110 may include bus bars 38 and 39, and a fuse case 109. The bus bars 38 and 39, and the fuse case 109 may respectively have different shapes from the bus bars 32 and 33, and the fuse case 50 in FIG. 1. The bus bars 38 and 39 may respectively include bent ends 38A and 39A extending toward and facing each other at opposite ends thereof on a same level.

The fuse case 109 may include a fuse wire 106 via an injection molding. The fuse case 109 may receive the bent ends 38A and 39A via one end thereof and connect the bent ends 38A and 39A via the fuse wire 106 therein. The bus bars 38 and 38, the fuse wire 106, and the fuse case 109 may respectively include the same materials as the bus bars 32 and 33, the fuse wire 49, and the fuse case 50 in FIG. 2.

Figure 8:
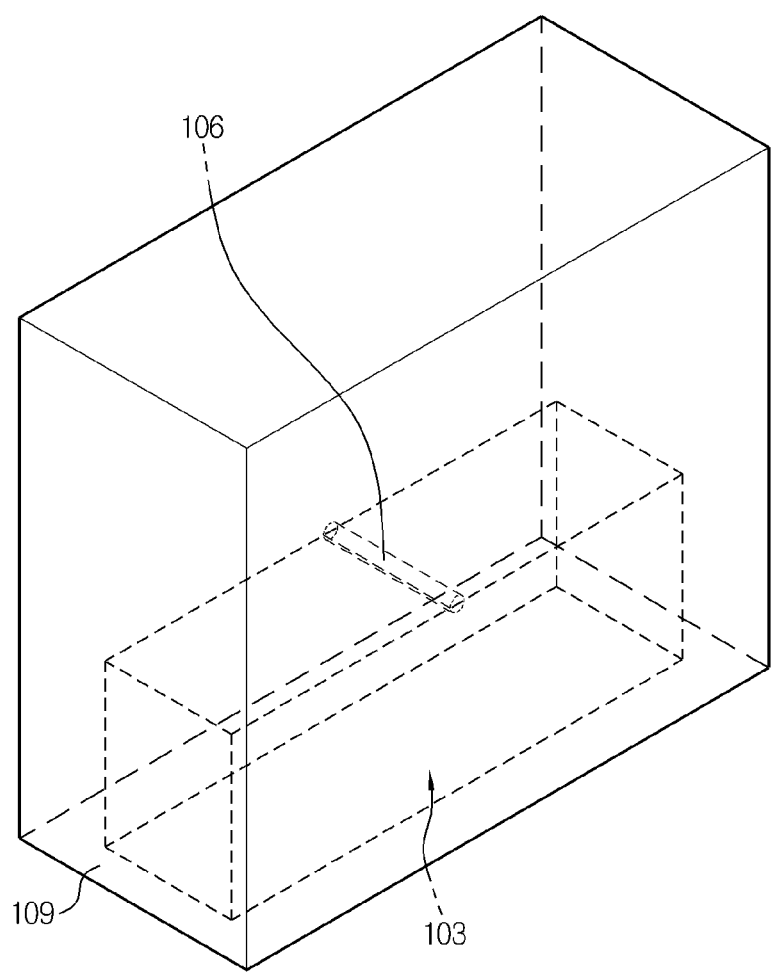
FIG. 8 is a perspective view of the fuse case in FIG. 7.

FIG. 8 is a perspective view of the fuse case 109 in FIG. 7.

Referring to FIG. 8, the fuse case 109 may have a groove 103 extending from a cross section inwardly at one end. Considering FIG. 7, the fuse case 109 may be configured to receive the bent ends 38A and 39A via the grooves 103 at the one end thereof, and to bring the bent ends 38A and 39A into contact with the fuse wire 106.

Figure 9:
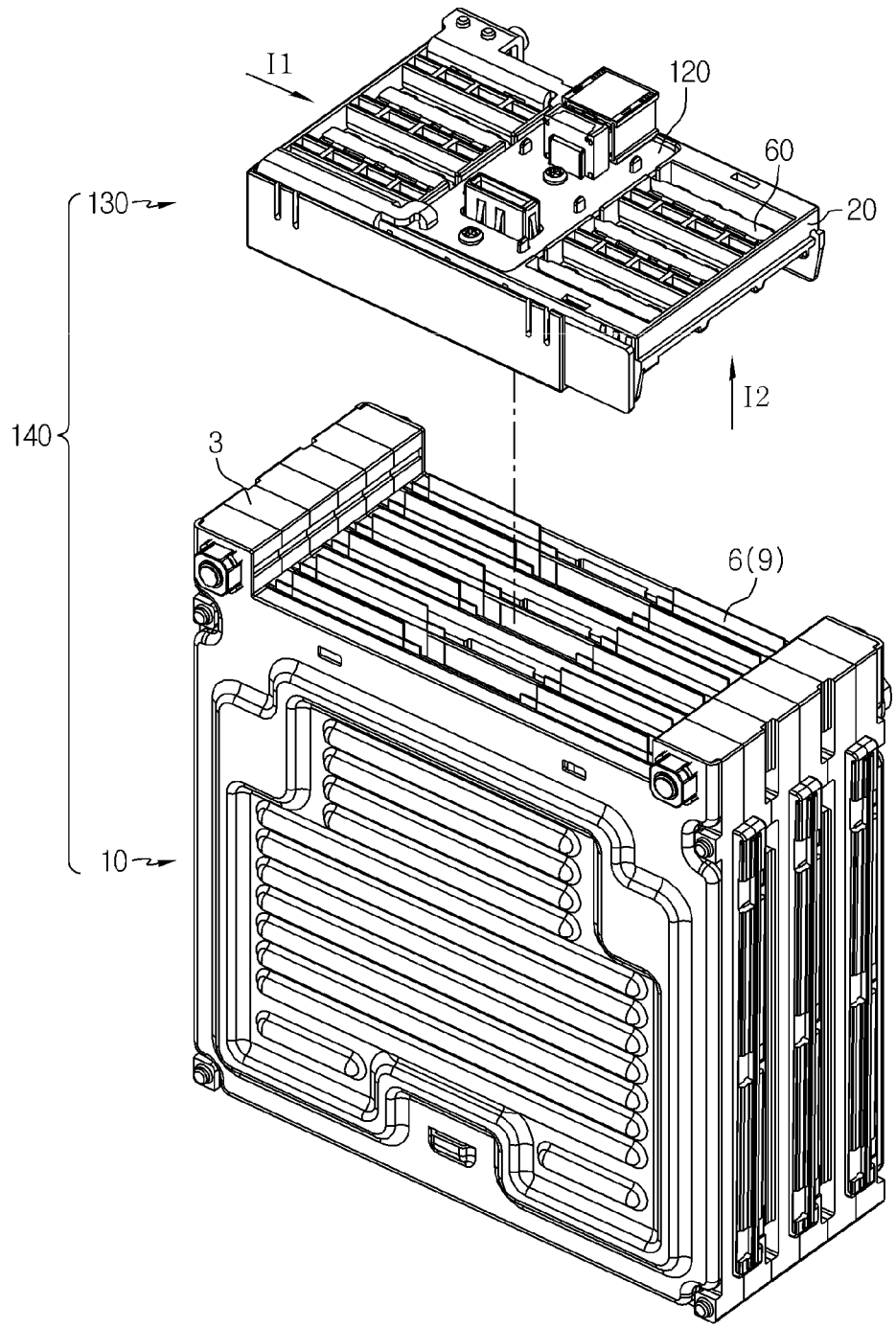
FIG. 9 is an exploded perspective view illustrating a manufacturing method and an operation mechanism of the battery pack of FIG. 1.

FIG. 9 is an exploded perspective view illustrating a manufacturing method and an operation mechanism of the battery pack 140 of FIG. 1.

Referring to FIG. 9, a battery module 10 and the ICB assembly 130 may be prepared. The battery module 10 may include cartridges 3 sequentially arranged and the battery cells 9 between the cartridges 3. The battery cells 9 may include the electrode leads 6. The ICB assembly 130 may include the base structure 20, the bus bar structures 60, and the PCB 120.

The base structure 20, the bus bar structures 60, and the PCB 120 were described in FIG. 1. In addition, the ICB assembly 130 may be arranged on the battery module 10. In this case, the electrode leads 6 of the battery cells 9 may penetrate the base structure 20 and be arranged on side surfaces of the bus bar structures 60.

Next, although not illustrated, the electrode leads 6 of the battery cells 9 may be bent on the bus bars 32 of the bus bar structures 60. The electrode leads 6 may overlap on the bus bars 32 in a unit of two. The electrode leads 6 may be welded onto the bus bars 32. Through afore-mentioned processes, the battery module 10 and the ICB assembly 130 may form the battery pack 140.

In order to describe the operation mechanism of the battery pack 140, a first current I1 may be applied to the ICB assembly 130 via an external electrical device (not illustrated) arranged the battery pack 140. In addition, the battery module 10 may transfer a second current I2 to the ICB assembly 130 via the bus bar structures 60 and the PCB 120.

In this case, when the first current I1 has a large value due to an abnormal operation of the external electrical device, or when the second current I2 has a large value due to an abnormal operation during repeated charging and recharging at one of the battery cells 9, respective fuse wires 49 of the bus bar structure 60 may be broken by the first current I1 or the second current I2. In addition, a state of the fuse wire 49 may be verified by being projected from the inside of the fuse case to the outside thereof.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A bus bar structure arranged below a printed circuit board (PCB) in an interconnect board (ICB) of a battery pack, the bus bar structure comprising:
    first and second bus bars sequentially arranged along a same plane in a length direction, and facing each other in the length direction, the first bus bar having substantially the same shape as the second bus bar; and
    a fuse case arranged between the first and second bus bars and including a fuse wire therein, the fuse case being provided above the first and second bus bars in a vertical direction, the vertical direction being perpendicular to the length direction,
    wherein the first bus bar includes:
        a main portion being substantially planar, the main portion extending in the length direction and a width direction, the width direction being perpendicular to the length direction, and the width direction being perpendicular to the vertical direction; and
        a first end extending in the vertical direction, the first end being substantially planar,
    wherein the second bus bar includes:
        a main portion being substantially planar, the main portion extending in the length direction and the width direction; and
        a first end extending in the vertical direction, the first end being substantially planar,
    wherein the ends of each of the first and second bus bars extend in the vertical direction into the fuse case,
    wherein the fuse wire contacts the first ends of the first and second bus bars,
    wherein the first end of the first bus bar is spaced apart from the first end of the second bus bar by a first distance, and
    wherein the fuse wire extends the entirety of the first distance.

2. The bus bar structure of claim 1, wherein one of the first and second bus bars is configured to contact the PCB and the other one of the first and second bus bars contacts an electrode lead of a battery cell.

3. The bus bars structure of claim 1,
    wherein the fuse wire is provided in a groove of the fuse case at one end of the fuse case, and
    wherein the first end of the first and second bus bars are in contact with the fuse wire via the groove of the fuse case.

4. The bus bar structure of claim 1, wherein the first and second bus bars and the fuse wire include metals and the fuse case includes a transparent insulating material which projects the fuse wire from the inside of the fuse case to the outside thereof.

5. The bus bar structure of claim 1, wherein the fuse case encompasses a majority of the first end of the first and second bus bars, and
    wherein the fuse case only contacts the first and second bus bars.

6. The bus bar structure of claim 1, wherein the fuse wire extends in the length direction.

7. The bus bar structure of claim 6, wherein the fuse case is wider, in the width direction, than each of the first and second bus bars, and
    wherein the fuse case only contacts the first and second bus bars.

* * * * *